United States Patent [19]

Teyssandier

[11] 4,109,523

[45] Aug. 29, 1978

[54] METHOD OF DETERMINING ACOUSTIC FLOW METER CORRECTION FACTOR

[75] Inventor: Raymond G. Teyssandier, Stevensville, Md.

[73] Assignee: Westinghouse Electric Corp., Pittsburgh, Pa.

[21] Appl. No.: 844,155

[22] Filed: Oct. 21, 1977

[51] Int. Cl.² .............................................. G01F 1/66
[52] U.S. Cl. ................................................ 73/194 A
[58] Field of Search ..................................... 73/194 A

[56] References Cited

U.S. PATENT DOCUMENTS

| | | | |
|---|---|---|---|
| 3,940,985 | 3/1976 | Wyler | 73/194 A |
| 4,024,760 | 5/1977 | Estrada, Jr. | 73/194 A |

Primary Examiner—Charles A. Ruehl
Attorney, Agent, or Firm—D. Schron

[57] ABSTRACT

A method of modifying multipath acoustic flow meter output readings by a certain correction factor, based upon the generation of data points utilizing an analytical formula for distorted fluid flow, and a numerical integration technique for obtaining the relationship between individual path flow and a correction factor, for two or more of the paths.

4 Claims, 18 Drawing Figures

Li Sin θ = li

METHOD OF DETERMINING ACOUSTIC FLOW METER CORRECTION FACTOR

BACKGROUND OF THE INVENTION

1. Field of the Invention

The invention in general relates to flow meters, and more particularly to a method of determining a correction factor for multipath acoustic flow meters.

2. Description of the Prior Art

Various systems exist for measuring volumetric flow rate in a fluid carrying conveyance. For many uses of such systems accuracy is a prime consideration in that an error, for example of 1%, in fluid flow measurement can represent many thousands of dollars. Accurate knowledge of volumetric flow rate is required for situations such as metering water to communities, measuring efficiency of various hydroelectric equipment, sewage treatment plants, and oil pipeline monitoring to name a few.

There are many piping conditions which will cause asymmetric distortions in the axial velocity profile of the flowing fluid. For example, distorted velocity profiles can be expected downstream of bends, tees, valves and other devices which may be within the flow field.

Flow measurement systems utilizing the propagation of acoustic energy through the fluid have demonstrated that volumetric flow, even with distorted velocity distributions can be measured to a relatively high degree of accuracy. One such highly accurate system is based upon time measurements of acoustic pulses propagated in opposite directions across the fluid medium. A plurality of acoustic paths are provided at specified locations and their individual flow readings are combined according to a numerical integration technique such as the Gaussian technique to compute volumetric flow rate. These systems are well known and are described for example in U.S. Pat. Nos. 3,564,912; 3,940,985; 4,024,760 and in application Ser. No. 748,258 filed Dec. 6, 1976, assigned to the present assignee.

For such multipath acoustic systems it would be desirable to establish the possible error, and the bounds on that error for general flow distortions. The present invention provides such method.

SUMMARY OF THE INVENTION

In accordance with the present invention, individual path readings are taken in an acoustic multipath flow meter to determine each path's contribution to the total flow. The values obtained from one or more chosen paths are compared with previously generated data defining the relationship of individual path flow to an error or correction factor to be utilized for modifying the flow meter output reading.

The previously generated data are obtained analytically utilizing a known formula for velocity profile for distorted flow in addition to a formula for a numerical integration technique such as the Gaussian technique. The correction factor for one set of variables is obtained by comparing the total flow utilizing the velocity profile equation with the total flow utilizing the Gaussian equation. The same set of parameters is utilized for calculating individual path flow such that the two variables, percentage flow and correction factor are obtained and recorded.

DESCRIPTION OF THE PREFERRED EMBODIMENT

Figure 1:
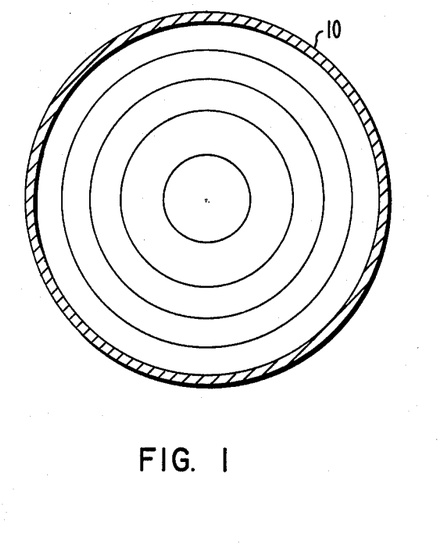
FIG. 1 is an axial cross-sectional view of a fluid conveying pipe illustrating isovels for an ideal well-developed fluid flow.
Figure 1A:
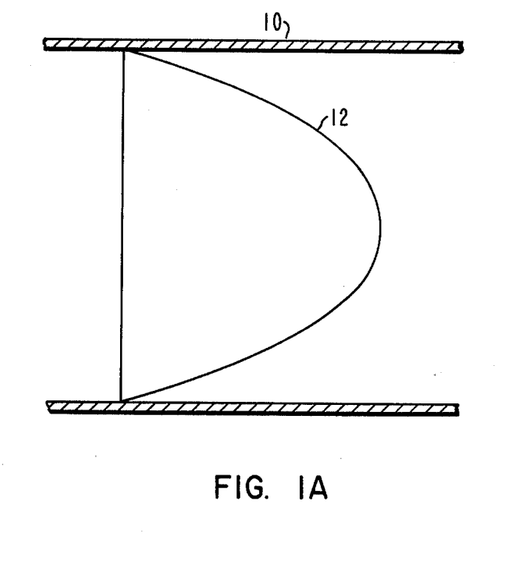
FIG. 1A is a side view of the pipe illustrating a velocity profile of the fluid.

Referring now to FIG. 1, there is shown an axial view of a fluid conveying pipe 10 illustrating a plurality of concentric isovels, an isovel being a line connecting points of equal fluid velocity. The fluid flowing in the pipe has a velocity profile as illustrated by curve 12 of FIG. 1A. Such velocity distribution in the pipe is illustrative of a well-developed flow as might be encountered in a pipe section many pipe diameters distant from a pipe bend, pipe intersection, valve or other similar devices which may be within the flow field.

Figure 2:
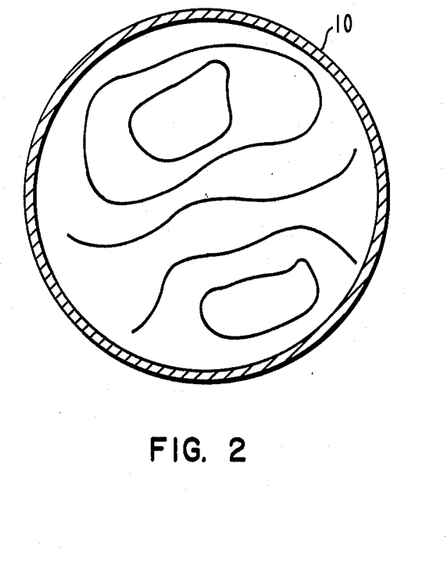
FIG. 2 is similar to FIG. 1 illustrating distorted flow.
Figure 2A:
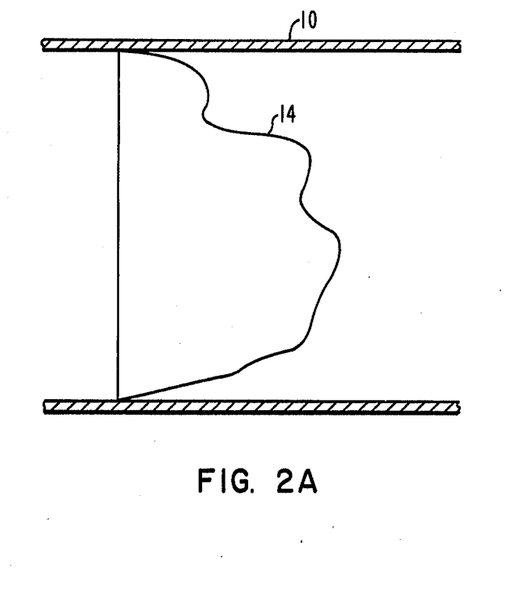

When the pipe section is located relatively close to these flow distorting entities the flow picture may appear as illustrated by the isovels of FIG. 2 with a typical velocity profile 14 illustrated in FIG. 2A.

In order to accurately measure fluid flow a multipath acoustic flow meter has been developed which provides a highly accurate indication of volumetric flow rate. The system utilizes pairs of opposed transducers installed at the boundary of a fluid conveyance so as to form parallel acoustic paths accurately positioned relative to the boundary in accordance with a numerical integration technique such as the Gaussian technique. The transducers simultaneously project an acoustic pulse toward an opposing transducer and the time of flight of the upstream traveling and downstream traveling pulse in each path to the opposing transducer is utilized, with proper Gaussian weighting factors, to provide an indication of volumetric flow rate.

Figures 3, 3A:
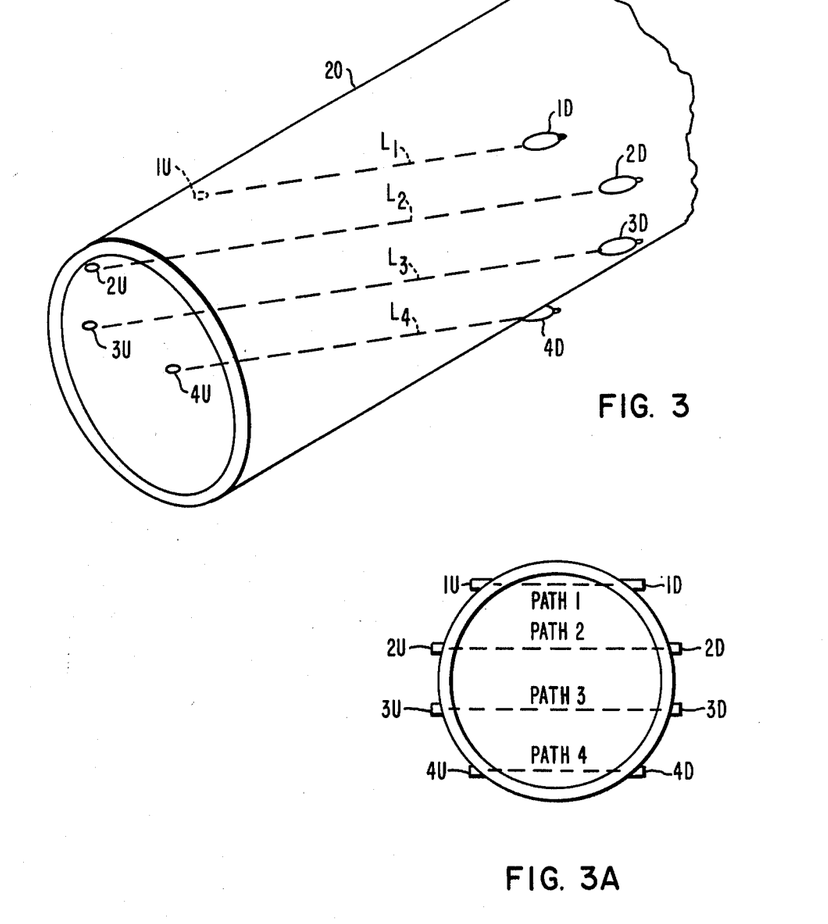
FIG. 3 is a view of a pipe section for a multipath acoustic flow meter.
FIG. 3A is an axial view of the arrangement of FIG. 3.

FIG. 3 illustrates a portion of a pipe 20 with a plurality of transducers installed in accordance with the Gaussian technique. Upstream transducer 1U in conjunction with its opposed downstream transducer 1D define an acoustic path, path 1, between them of length $L_1$. The second pair of transducers 2U and 2D define path 2 of length $L_2$. Opposed transducers 3U and 3D define acoustic path 3 of length $L_3$ and transducers 4U and 4D define acoustic path 4 of length $L_4$. For the four path system as shown, and for a circular pipe, the transducers are generally positioned such that $L_1$ is equal to $L_4$ and $L_2$ is equal to $L_3$.

Figure 3B:
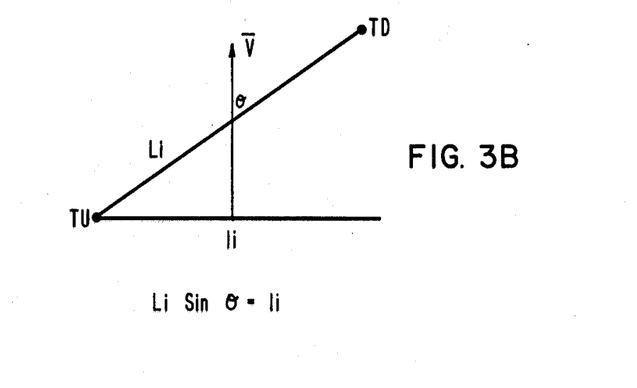
FIG. 3B is a generalized representation of 1 path of an acoustic flow meter, serving to define certain parameters.

FIG. 3A is a view of the arrangement looking down the pipe axis in the direction of fluid flow and FIG. 3B illustrates the general case of opposed upstream and downstream transducers designated TU and TD (shown as points), separated by an acoustic path of length $L_i$ lying at an angle with respect to axial fluid flow. The average fluid velocity as would be measured by the single path system is designated by $\bar{v}$ and this velocity vector is perpendicular to the line designated $1_i$, the projection of path $L_1$ onto a plane perpendicular to the velocity vector.

Before proceeding with the detailed description of the invention it would be beneficial to have an understanding of fluid flow measurements utilizing acoustic pulse travel times. In a single path system, volumetric flow rate may be determined by simultaneously energizing an upstream and a downstream transducer and measuring the acoustic pulse downstream travel time and the acoustic pulse upstream travel time. If $t1$ is the downstream travel time and $t2$ is upstream travel time the volumetric flow rate Q may be determined by the relationship $$Q = K \frac{t1 - t2}{t1 t2} \quad (1)$$

where K is a constant dependent upon such factors as path length, the angle that the path makes with respect to fluid flow, and conversion units. The difference in travel times of the oppositely directed acoustic pulses along the path is $\Delta t$ and $$\Delta t = t2 - t1 \quad (2)$$

since $t2$ equals $t1 + \Delta t$ $$Q = \frac{K \Delta t}{t1(t1 + \Delta t)} \quad (3)$$

Equation 3 may be implemented with the provision of two counters, one a $t1$ counter which is turned on at the time of the acoustic transmission and which is turned off when the downstream transducer receives the acoustic pulse. A second counter, a $\Delta t$ counter, is turned on when the downstream pulse is received and turned off when the upstream pulse is received with the resulting count being indicative of the difference in travel times.

In the multipath Gaussian technique volumetric flow rate Q is given by the relation $$Q = \frac{D}{2} \sum_{i=1}^{n} q_i \quad (4)$$

where
 D is the pipe diameter
 n is the number of paths
 i is a particular path number and $q_i$ is given by the relationship $$q_i = (w_i L_i^2 \tan\theta) \frac{\Delta t}{t1(t1 + \Delta t)} \quad (5)$$

where $w_i$ is the Gaussian weighting factor for the $i^{th}$ path.

For a four-path system such as illustrated in FIG. 3, $$Q = D/2 [q_1 + q_2 + q_3 + q_4] \quad (6)$$

Figure 4:
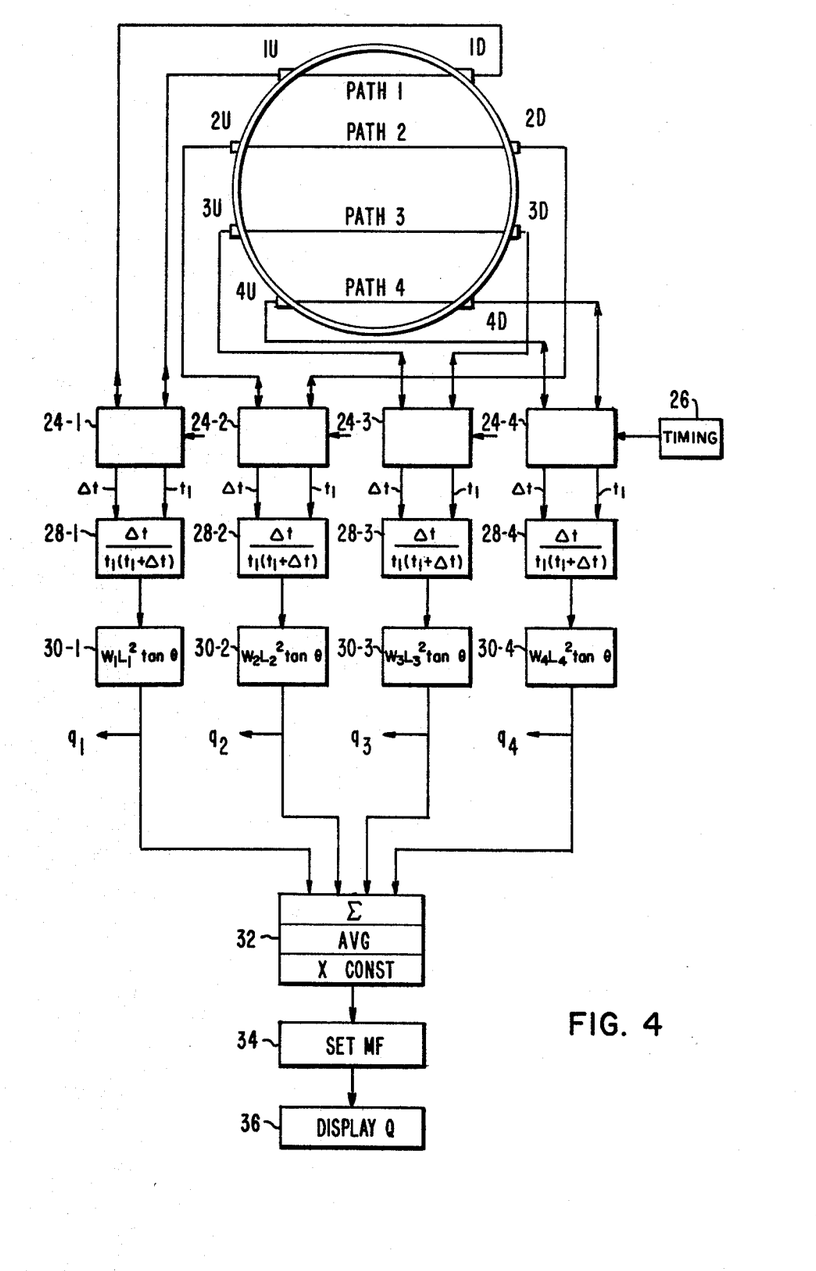
FIG. 4 is a block diagram of a multipath flow meter system.

FIG. 4 is a block diagram of apparatus for implementing the Gaussian technique for computing volumetric flow rate. For ease of understanding, each acoustic path includes a respective signal processing channel, although in actual practice the implementation may be performed by a special purpose computer. The acoustic pulses in the four paths are generated and received by respective transmit receive circuits 24-1 for path 1, 24-2 for path 2, 24-3 for path 3 and 24-4 for path 4. These circuits include the aforementioned $t1$ and $\Delta t$ counters such that a $t1$ and $\Delta t$ value for each path is provided to respective electronic circuits 28-1 to 28-4 to provide an indication of $[\Delta t/t1(t1 + t)]$ for each path.

In accordance with equation (5), these values are multiplied in respective circuits 30-1 to 30-4 by a constant $w_i L_i^2 \tan\theta$, to provide respective path volumetric flow rates $q_1$ through $q_4$. The individual path values are summed, averaged over a predetermined period of time and multiplied by the constant related to the pipe diameter and conversion units. This operation is accomplished in circuit 32.

Although the volumetric flow rate reading obtained is highly accurate, an even more accurate output may be provided by multiplying the result by a certain correction factor $M_f$ in circuit 34 the output of which is provided to a display 36. With a known profile the correction factor is known to a reasonable degree of accuracy. However, with distorted flow, such as depicted in FIG. 2, the correction factor would not be accurately known. The present invention provides a method for estimating the proper correction factor and for bounding the factor within a certain range.

Figure 5:
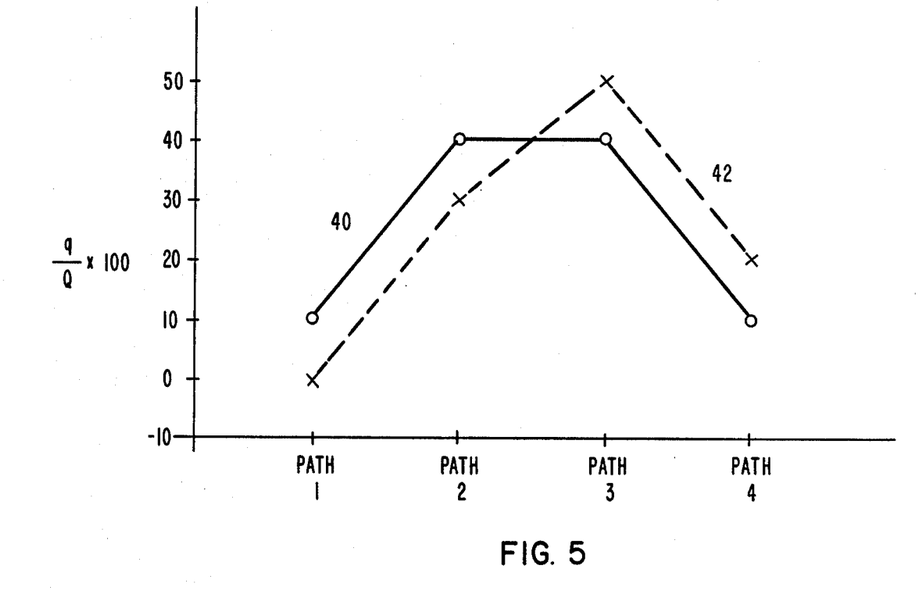
FIG. 5 is a graph illustrating the percentage of individual path flow with respect to total flow, for a multipath system.
Figure 6A:
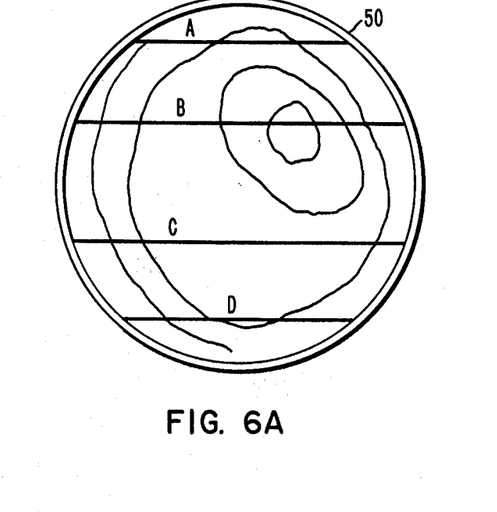
FIGS. 6A through 6E illustrate the rotation of the paths of a multipath system, utilized in certain computations therein.
Figure 6B:
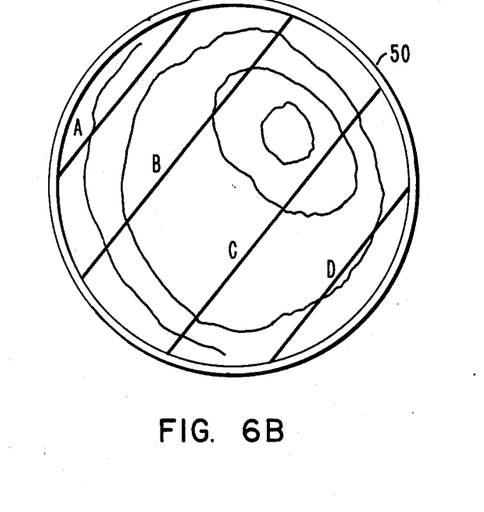
Figure 6C:
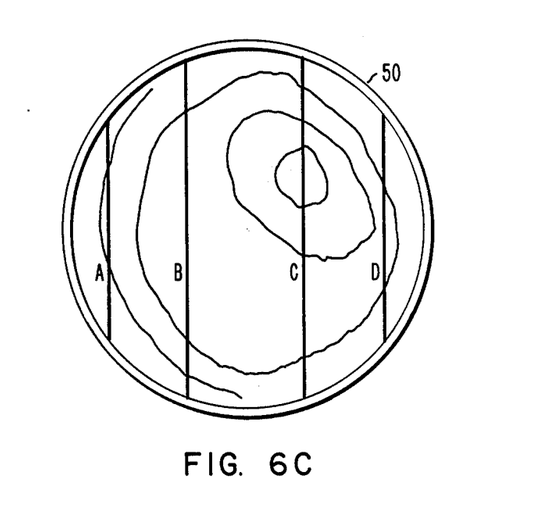
Figure 6D:
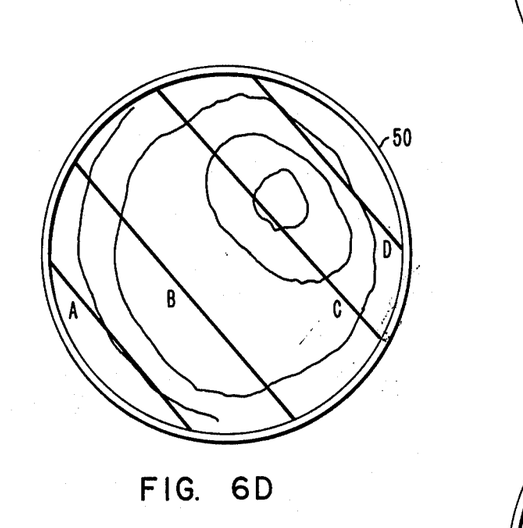
Figure 6E:
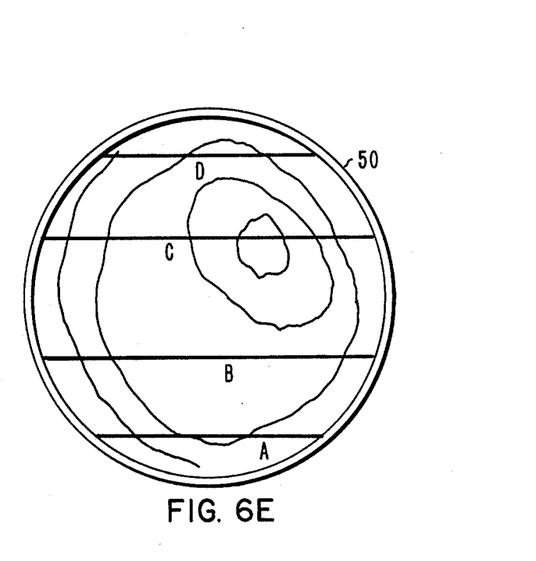

If the individual flow path value $q$ is compared with total Q for the four paths, an ideal result may be as illustrated by graph 40 of FIG. 5 wherein the vertical axis is the ratio of $q/Q$, in percentage value. By way of example, path 1 reading yields a flow rate of 10% of the total, paths 2 and 3, 40% each of the total and path 4, 10% of the total. A somewhat distorted profile may be illustrated by the dotted graph 42 which illustrates zero percent of the total flow contributed by path 1 (and in some instances these values may be negative), path 2 contributes 30%; path 3, 50% and path 4, 20%.

Basically, as will be explained, in practicing the present invention, a generalized formula for velocity profile for distorted flow is utilized in conjunction with the Gaussian computation for flow, to generate correction factor values. These values are plotted as a functional of individual path flow for at least two paths, to devise for each said path a $q/Q$ versus $M_f$ bounded area.

Measurements are then taken with the flow meter in actual operation and flow readings are obtained to see if the $q/Q$ value of an individual path falls within the plotted bounded area. If so, a correction factor bound or range for the flow meter output reading may then be determined.

More specifically, one well-known generalized formula for velocity profile for distorted flow is given by the equation:

$$V = (1-r)^k + mr(1-r)^N e^{-a\alpha} \sin\delta \quad (7)$$

where

|  | Typical Value Range |
|---|---|
| V - axial velocity at a certain point | |
| r - radius | |
| k - power profile exponent | .09 to .2 |
| m - a first constant which defines the magnitude of distortion | −4 to +4 |
| N - another constant which defines magnitude of distortion | .09 to .2 |
| a - constant which locates the maximum distortion in the α direction | 0 to ∞ |
| α - angular position or polar coordinate | 0 to 2π |

In order to obtain an ideal value for volumetric flow rate, $Q_{ideal}$, equation (7) is integrated with respect to both radius and angle α. That is:

$$Q_{ideal} = \int_0^{2\pi} \int_0^r \sqrt{(r,\delta)} \, r \, dr \, d\delta \quad (8)$$

Volumetric flow rate Q is then calculated in accordance with the gaussian method. If $Q = Q_{ideal}$ then no correction of the Gaussian result need be made. In actuality, however, the values will differ such that a correction factor $M_f$ is required, and this correction factor is given by the relationship:

$$M_f = \frac{Q_{ideal}}{Q} \quad (9)$$

Since the previously given formula for the Gaussian technique is given in terms of acoustic pulse travel times, and since the initial calculation of $M_f$ is obtained using formulas, another expression for the Gaussian technique is utilized and that is:

$$Q = \frac{D}{2} \sum_{i+1}^{n} w_i \bar{v} l_i \quad (10)$$

Using the expression of equation (7) for velocity and integrating over the length $l_i$ (see FIG. 3B):

$$\bar{v}l = \int_{-\frac{l_1}{2}}^{+\frac{l_1}{2}} v(r,\delta) dl \quad (11)$$

Utilizing equation (11), in addition to total Q, equation (10), individual path values q may be obtained as well as the ratio q/Q for each path. Therefore with one chosen set of constants and with one multipath orientation, one value of correction factor is obtained as well as a q/Q value for each path. That is, for a four-path system four points are generated. The process is then repeated, preferably by computer operation, for various other combination of constants. The choosing of various angles α has the effect of varying the path orientations as shown by paths A through D of FIGS. 6A through 6E. The paths are shown as being rotated from an initial orientation of α = 0° to a final orientation of α = 180°. In order to generate a number of data points these path orientations may be stepped in one degree increments, for example. These path orientations in FIGS. 6A to 6E are superimposed upon an axial cross-sectional view of pipe 50 having a fluid flowing therein with a distorted flow as represented by the isovels.

The results of the previous computations may be stored in a computer table lookup and/or may be plotted. FIGS. 7A through 7D show the results of some actual computations. In each Figure the vertical axis represents the ratio of a particular path flow to the total flow (q/Q in percentage) as computed by the Gaussian technique, and the horizontal axis represents the correction factor as computed from the ratio of ideal flow, equation (8), to Gaussian computed flow, equation (10).

The shapes of FIGS. 7A through 7D represent the bounds on the plurality of generated data points. The bounded shaded areas become well defined with the plotting of hundreds of data points and become even further defined with the plotting of thousands of data points.

As a result of the calculations, it is seen that for the distorted flow, path A may contribute anywhere from +10 to −10% of the total flow, path B from 14 to 37% of the total flow, path C from 40 to 75% of the total flow and path D from 10 to 25% of the total flow. It will be remembered that in an ideal situation, and as illustrated by the points joined by the solid line 40 of FIG. 5, the two short paths A and D will contribute 10% and the two longer paths will contribute 40% each to the total flow; such, however, is not the case for distorted flow as demonstrated in FIGS. 7A through 7D. It is seen that for practically any path B value and for any expected path D value the correction factor range will be the same, 0.98 to 1.04, and thus these two Figures shed little light on a more definite correction factor range. Path C values of FIG. 7C appear to be the most information bearing with the path A values of FIG. 7A serving to operate as a second order confirmation of a correct choice of meter factor. In examining FIG. 7C it is seen that for a computed value of q/Q of between 40 and 50%, the correction factor will range from 0.98 to 1.0. For a q/Q from 50 to 68%, the correction factor will vary from 0.98 to 1.02, and for a q/Q of 68 to 75% the meter factor will vary from 1.01 to 1.04.

Figure 7A:
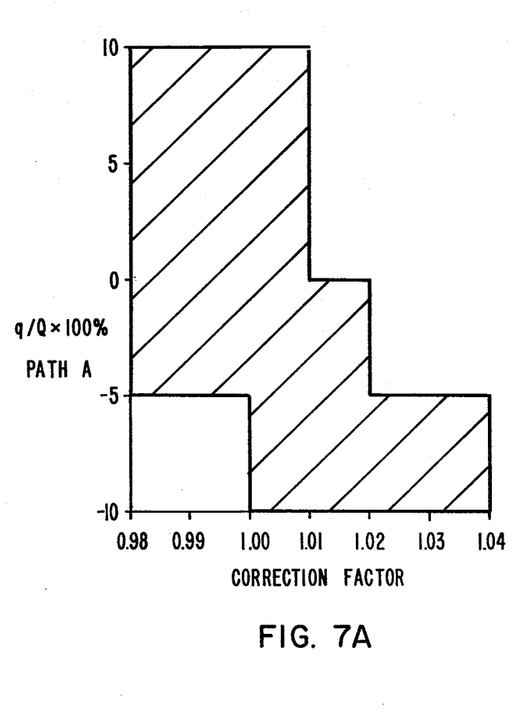
FIGS. 7A through 7D are charts illustrating the relationship between individual path flow percentages and correction factors, for the individual paths of a multipath system.
Figure 7B:
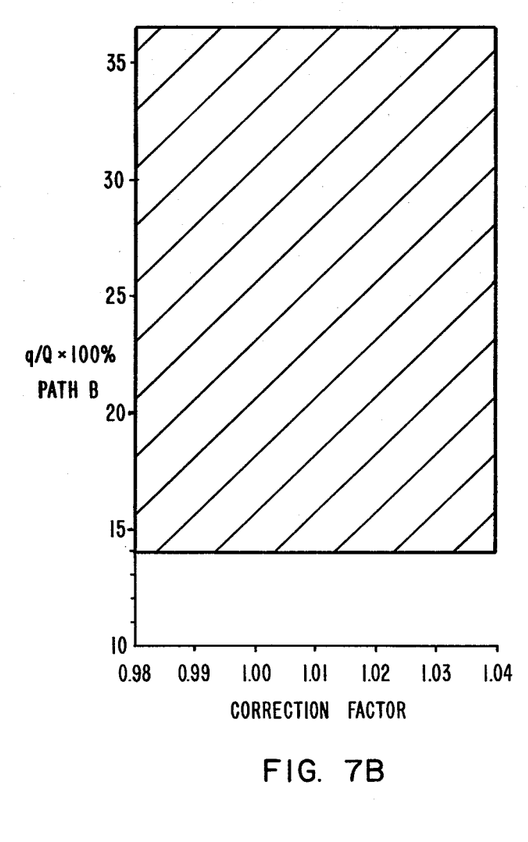
Figure 7C:
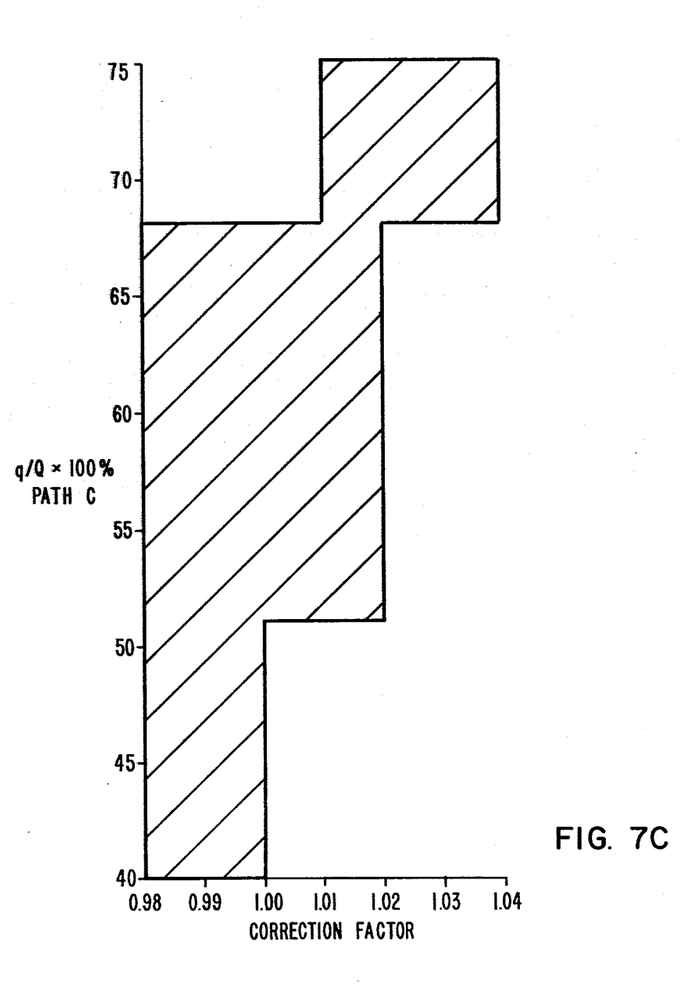
Figure 7D:
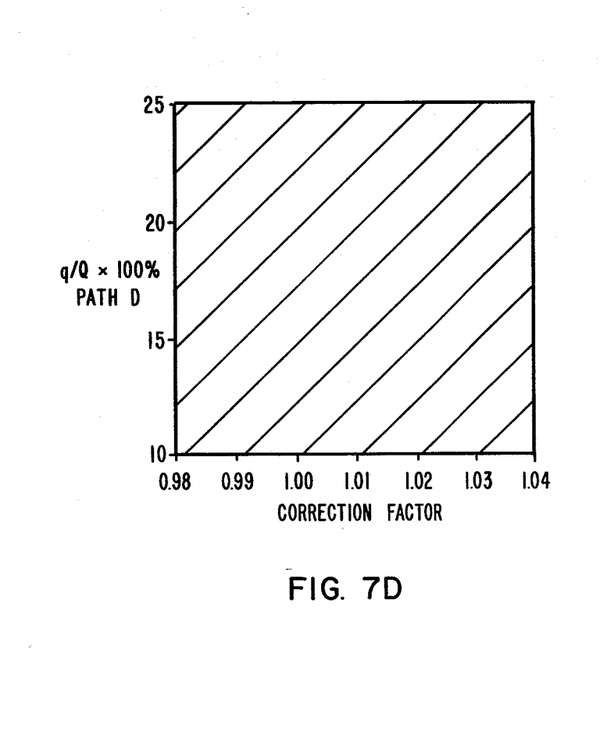

If the path A q/Q value ranges from −10 to −5% the correction factor will range from 1.00 to 1.04. For q/Q value of −5 to 0% the correction factor will range from 0.98 to 1.02 and for a q/Q of 0 to 10% the correction factor will range from 0.98 to 1.01.

The information contained in FIGS. 7A to 7D is utilized as follows. With an actually operating flow meter, individual path values are measured such as by the output of circuits 30-1 through 30-4 of FIG. 4. With the correction factor $M_f$ of circuit 34 set at 1.00 (or an output from circuit 32 taken) the ratios of individual flow path values to the total flow are obtained. If flow path 2 contributes less than 40% of the total then $q_1 = q_A$
$q_2 = q_B$
$q_3 = q_C$
$q_4 = q_D$ If flow path 3 contributes less than 40% of the total then $q_1 = q_D$
$q_2 = q_C$
$q_3 = q_B$
$q_4 = q_A$ Let it be assumed by way of example that the individual flow readings taken from an actually operating flow meter results in individual path flow percentages as illustrated by the points joined by the dotted line of FIG. 5, that is, path 1 contributes 0%; path 2, 30%; path 3, 50%; and path 4, 20%. Since the path 2 value is less than 40%, path A is equated with path 1, path B with path 2, path C with path 3, and path D with path 4.

With respect to path C (path 3) it is seen that for a 50% contribution the correction factor ranges from 0.98 to 1.00. Therefore a correction factor 0.99 may be chosen with a range or bound of ±0.01 or ±1%. As a second order check on this value, the flow contribution of path A (path 1) is 0% and for this value the correction factor ranges from 0.98 to 1.01, encompassing the chosen correction factor. This operation may if desired be automated, that is, a range may be determined and an average calculated to automatically set circuit 34 of FIG. 4, or the operation may be done manually.

FIGS. 7A through 7D demonstrate that correction factors fall within the range of 0.98 to 1.04 indicating that substantial errors could result if the acoustic flow meter was blindly placed within a flow system. By plotting path values for the individual paths as a function of correction factor, a pattern emerges, as indicated by the shaded areas of FIGS. 7A to 7D which may be utilized to ascertain a mean correction factor and bound the expected error.

What is claimed is:

1. In acoustic multipath flowmeter apparatus, a method of establishing a flow calculation error and the bounds on that error comprising the steps of:
   (A) analytically determining for a first set of chosen parameters, total flow utilizing a generalized formula for velocity profile for distorted flow;
   (B) analytically determining, with said same set of parameters, total flow, and individual path flow utilizing a formula for numerical integration;
   (C) establishing an error factor between the results of said two determinations;
   (D) determining the percentage of total flow for each said path;
   (E) recording the relationship between the results of said last named determination and said error factor; and
   (F) repeating the above steps for different sets of parameters.

2. A method according to claim 1 which includes the steps of:
   (A) obtaining a total flow measurement and individual path flow measurements in an operating flowmeter;
   (B) determining from said measurements, the percentage of total flow for at least a chosen one of said paths;
   (C) determining a correction factor from said recorded relationships utilizing said last name determination; and
   (D) modifying said total flow measurement by said correction factor.

3. A method according to claim 2 wherein:
   (A) the percentages of total flow for two chosen paths are determined.

4. A method according to claim 1 wherein:
   (A) said formula for numerical integration is the Gaussian technique.

* * * * *